(12) United States Patent
Kemmerling et al.

(10) Patent No.: US 10,378,433 B2
(45) Date of Patent: Aug. 13, 2019

(54) SUPERCHARGED INTERNAL COMBUSTION ENGINE WITH EXHAUST-GAS TURBOCHARGING ARRANGEMENT, AND METHOD FOR OPERATING AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Hanno Friederichs, Aachen (DE); Helmut Matthias Kindl, Aachen (DE); Vanco Smiljanovski, Bedburg (DE); Franz Arnd Sommerhoff, Aachen (DE); Andreas Kuske, Geulle (NL); Frank Wunderlich, Herzogenrath (DE)

(73) Assignee: Forb Global Technologies, LLC, Dearborn, MI (US)

( * ) Notice: Subject to any disclaimer, the term of this patent is extended or adjusted under 35 U.S.C. 154(b) by 183 days.

(21) Appl. No.: 15/415,665

(22) Filed: Jan. 25, 2017

(65) Prior Publication Data
US 2017/0218834 A1   Aug. 3, 2017

(30) Foreign Application Priority Data

Feb. 1, 2016   (DE) .................. 10 2016 201 464

(51) Int. Cl.
*F02B 29/04*   (2006.01)
*F02B 37/00*   (2006.01)
(Continued)

(52) U.S. Cl.
CPC .............. *F02B 37/04* (2013.01); *F01N 5/04* (2013.01); *F02B 29/0412* (2013.01);
(Continued)

(58) Field of Classification Search
CPC .................. F02B 37/004; F02B 37/013; F02B 37/04–11; F02B 39/10; F02B 63/04–043; Y02T 10/144
(Continued)

(56) References Cited

U.S. PATENT DOCUMENTS 8,453,447 B2   6/2013   Barth et al.
8,671,682 B2   3/2014   Parlow et al.
(Continued)

FOREIGN PATENT DOCUMENTS

DE   102006011188 A1   9/2007
DE   102007057224 A1 * 1/2009 ............... B60K 6/26
(Continued)

OTHER PUBLICATIONS

Munz, S., et al., "eBooster: Design and Performance of a Innovative Electrically Driven Charging System," Driven By Knowledge, BorgWarner Turbo Systems, Borg Warner Inc., 20 pages.
(Continued)

*Primary Examiner* — Laert Dounis
(74) *Attorney, Agent, or Firm* — Julia Voutyras; McCoy Russell LLP

(57) ABSTRACT

The disclosure relates to a supercharged internal combustion engine with an intake system and an exhaust gas discharge system that include two turbochargers arranged in series, a turbo-generator, and an electrically-driven compressor. During engine operation with mid-to-high exhaust gas flow rates, excess exhaust gas that bypasses the high-pressure turbocharger may be directed through the turbo-generator to generate electricity that may be provided to drive the electrically-driven compressor.

14 Claims, 8 Drawing Sheets

(51) Int. Cl.
*F02B 37/04* (2006.01)
*F02B 37/18* (2006.01)
*F02B 39/10* (2006.01)
*F02B 63/04* (2006.01)
*F02B 37/013* (2006.01)
*F01N 5/04* (2006.01)

(52) U.S. Cl.
CPC .......... *F02B 37/004* (2013.01); *F02B 37/013* (2013.01); *F02B 37/18* (2013.01); *F02B 39/10* (2013.01); *F02B 63/04* (2013.01); *Y02T 10/144* (2013.01); *Y02T 10/146* (2013.01); *Y02T 10/16* (2013.01)

(58) Field of Classification Search
USPC .......................................................... 60/612
See application file for complete search history.

(56) References Cited

U.S. PATENT DOCUMENTS

| | | |
|---|---|---|
| 9,010,117 B2 | 4/2015 | Genter |
| 2011/0094224 A1* | 4/2011 | Sheidler ................ B60K 6/485 60/605.2 |
| 2011/0094485 A1* | 4/2011 | Vuk .......................... F01N 5/04 123/568.21 |
| 2011/0094486 A1* | 4/2011 | Vuk .......................... F01N 5/04 123/568.21 |
| 2013/0055711 A1* | 3/2013 | Hofer .................... F02B 37/013 60/602 |
| 2013/0199179 A1* | 8/2013 | Kitsukawa ............ F02B 37/013 60/605.2 |
| 2014/0230430 A1* | 8/2014 | Krug ................... F02B 29/0412 60/600 |
| 2016/0265485 A1* | 9/2016 | Massard ............... F02D 41/005 |

FOREIGN PATENT DOCUMENTS

| | | | |
|---|---|---|---|
| DE | 102012011086 A1 * | 12/2013 | ............. F02D 23/00 |
| DE | 102013001662 A1 | 7/2014 | |
| EP | 1355052 A1 | 10/2003 | |
| EP | 1640596 A1 | 3/2006 | |
| FR | 2895454 A1 * | 6/2007 | ............ F02B 37/013 |
| JP | S55109728 A | 8/1980 | |

OTHER PUBLICATIONS

Schmitt, Frank, et al., "Powerful Turbocharging System for Passenger Car Diesel Engines," Knowledge Library, Borg Warner Inc., 2014, 10 pages.

* cited by examiner

SUPERCHARGED INTERNAL COMBUSTION ENGINE WITH EXHAUST-GAS TURBOCHARGING ARRANGEMENT, AND METHOD FOR OPERATING AN INTERNAL COMBUSTION ENGINE OF SAID TYPE

CROSS REFERENCE TO RELATED APPLICATIONS

This application claims priority to German Patent Application No. 102016201464.1, filed on Feb. 1, 2016. The entire contents of the above-referenced application are hereby incorporated by reference in its entirety for all purposes.

FIELD

The present disclosure provides systems and methods for turbocharging an internal combustion engine.

BACKGROUND/SUMMARY

Within the context of the present disclosure, the expression "internal combustion engine" encompasses Otto-cycle engines, diesel engines and also hybrid internal combustion engines, which utilize a hybrid combustion process, and hybrid drives which comprise not only the internal combustion engine but also an electric machine which may be connected in terms of drive to the internal combustion engine and which receives power from the internal combustion engine or which, as a switchable auxiliary drive, additionally outputs power.

In the development of internal combustion engines, it is a basic aim to minimize fuel consumption, wherein the emphasis in the efforts being made is on obtaining good overall efficiency.

Fuel consumption and thus efficiency pose a problem in particular in the case of Otto-cycle engines, in which the demanded load or power is set by varying the charge of the combustion chamber, that is to say by quantity regulation. However, quantity regulation by a throttle flap has thermodynamic disadvantages in the part-load range owing to the throttling losses.

One approach to a solution for dethrottling the Otto-cycle engine is for example, an Otto-cycle engine operating process with direct injection. The injection of fuel directly into the combustion chamber of the cylinder is considered to be a suitable measure for noticeably reducing fuel consumption even in Otto-cycle engines. The dethrottling of the internal combustion engine is realized by virtue of quality regulation being used within certain limits. Accordingly, by way of direct injection, it is possible to realize a stratified combustion chamber charge. The use of an at least partially variable valve drive likewise offers the possibility of dethrottling. The cylinder deactivation, that is to say the deactivation of individual cylinders in certain load ranges, likewise serves for dethrottling the Otto-cycle engine. The efficiency in part-load operation can be improved, that is to say increased, by way of a partial deactivation because the deactivation of one cylinder of a multi-cylinder internal combustion engine increases, in the case of constant engine power, the load on the other cylinders which remain operational. During the partial deactivation, the cylinders which are permanently in operation furthermore operate in the region of higher loads, at which the specific fuel consumption is lower. The load collective is shifted toward higher loads.

A further measure for improving the efficiency of an internal combustion engine and/or for reducing the fuel consumption consists of supercharging of the internal combustion engine, wherein supercharging is primarily a method of increasing power, in which the air required for the combustion process in the engine is compressed, whereby a greater mass of air can be supplied to each cylinder per working cycle. In this way, the fuel mass and therefore the mean pressure can be increased.

Supercharging is a suitable mechanism for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible to shift the load collective toward higher loads, at which the specific fuel consumption is lower. By supercharging in combination with a suitable transmission configuration, it is also possible to realize so-called downspeeding, with which it is possible to achieve a lower specific fuel consumption.

Supercharging consequently assists in the constant efforts in the development of internal combustion engines to minimize fuel consumption, which is to say to improve the efficiency of the internal combustion engine.

For supercharging, use is generally made of an exhaust-gas turbocharger, in which a compressor and a turbine are arranged on the same shaft. The hot exhaust-gas flow is supplied to the turbine and expands in said turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooling arrangement may additionally be provided in the intake system downstream of the compressor, by which the compressed charge air is cooled before it enters the cylinders.

The advantage of an exhaust-gas turbocharger in relation to a mechanical charger is that no mechanical connection for transmitting power exists or is required between the exhaust-gas turbocharger and internal combustion engine. While a mechanical supercharger extracts the energy required for driving it entirely from the internal combustion engine, and thereby reduces the output power and consequently adversely affects the efficiency of the engine, the exhaust-gas turbocharger utilizes the exhaust-gas energy of the hot exhaust gases.

The advantage of a mechanical supercharger in relation to an exhaust-gas turbocharger consists in that the mechanical supercharger generates, and makes available, the required charge pressure at all times, specifically regardless of the operating state of the internal combustion engine, in particular regardless of the present rotational speed of the crankshaft. This applies, in particular, to a mechanical supercharger which can be driven by way of an electric machine.

Problems are encountered in the configuration of the exhaust-gas turbocharging, wherein it is basically sought to obtain a noticeable performance increase at all engine speed ranges. In the case of supercharged internal combustion engines with an exhaust-gas turbocharger, a relatively severe torque drop is observed when a certain engine speed is undershot.

Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. As a result, the charge pressure ratio likewise decreases in the direction of lower engine speeds, which equates to a torque drop.

Previously, a variety of measures have been used to enhance the torque characteristic of an exhaust gas-turbocharged internal combustion engine, including a small turbine cross section and provision of an exhaust-gas blow-off facility. To this end, a turbine may be equipped with a bypass line which branches off from the exhaust-gas discharge system upstream of the turbine and in which a shut-off element is arranged. Such a turbine is also referred to as a wastegate turbine. If the exhaust-gas mass flow exceeds a threshold value, a part of the exhaust-gas flow is conducted past the turbine, that is to say is blown off, via a bypass line during the course of the so-called exhaust-gas blow-off. This procedure has the disadvantage that the high-energy blown-off exhaust gas remains unutilized and the supercharging behavior is often insufficient at higher engine speeds or in the case of relatively high exhaust-gas quantities.

The torque characteristic of the supercharged internal combustion engine may also be enhanced by multiple turbochargers arranged in parallel, for example, by multiple turbines of relatively small turbine cross section arranged in parallel. The turbines may be activated successively with increasing exhaust-gas flow rate.

The torque characteristic may also be influenced by connecting multiple exhaust-gas turbochargers in series. In one example, connecting two exhaust-gas turbochargers in series, wherein a first exhaust-gas turbocharger serves as a high-pressure stage and a second exhaust-gas turbocharger serves as a low-pressure stage, the compressor characteristic map may be expanded to include both smaller compressor flows and larger compressor flows.

In particular, with the first exhaust-gas turbocharger, which serves as a high-pressure stage, it is possible for the surge limit to be shifted in the direction of smaller compressor flows; because of which high charge pressure ratios may be obtained even with small compressor flows, which may considerably enhance the torque characteristic in the lower engine speed range. This is achieved by using the high-pressure turbine for small exhaust-gas mass flows and by providing a bypass line by which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine, wherein a shut-off element is arranged in the bypass line in order to control the exhaust-gas flow conducted past the high-pressure turbine.

The downsizing effect is further enhanced by way of multi-stage supercharging by exhaust-gas turbochargers. Furthermore, the response behavior of an internal combustion engine supercharged in this way is considerably improved in relation to a similar internal combustion engine with single-stage supercharging, because the relatively small high-pressure stage is less inert, and the rotor of a smaller-dimensioned exhaust-gas turbocharger can be accelerated more rapidly.

The European patent EP 1 640 596 B1 discloses an internal combustion engine having two exhaust-gas turbochargers arranged in series, of which a first exhaust-gas turbocharger serves as a low-pressure stage and a second exhaust-gas turbocharger serves as a high-pressure stage. The turbocharger system includes a valve system having valve members that are independently controllable so as to selectively control the gas flow into the turbine portions of the high-pressure turbocharger and the low-pressure turbocharger units.

However, the inventors herein have recognized that the turbocharger system described in EP 1 1640 596 does not provide active control of high boost pressure to the engine over a wide range of speed and load conditions. Further measures may be desired in order to improve the torque characteristic and in order to increase efficiency in order to satisfy the future demands placed on a modern exhaust-gas-turbocharged internal combustion engine. In particular, supercharging concepts are of interest with which the surge limit can be shifted further toward even lower charge-air flow rates in order to improve the torque characteristic of the internal combustion engine at very low engine speeds. Furthermore, an ever faster response of the supercharging arrangement is demanded in order to improve the transient behavior of the internal combustion engine. The latter is in particular also of relevance in conjunction with exhaust-gas recirculation. Furthermore, it is basically always the case that a high maximum power or large power increase is sought.

The inventors herein have recognized the above cited potential issues, and provide systems and methods to at least partly address the issues. In one example, a supercharged internal combustion engine system comprises an intake system for supply of charge air to an internal combustion engine; an exhaust-gas discharge system for discharge of exhaust gases from the internal combustion engine; at least two series-connected exhaust-gas turbochargers which each comprise a turbine arranged in the exhaust-gas discharge system and a compressor arranged in the intake system, the at least two series-connected exhaust-gas turbochargers including a first exhaust-gas turbocharger that serves as a low-pressure stage and a second exhaust-gas turbocharger that serves as a high-pressure stage, a second compressor of the second exhaust-gas turbocharger arranged downstream of a first compressor of the first exhaust-gas turbocharger, a first turbine of the first exhaust-gas turbocharger arranged downstream of a second turbine of the second exhaust-gas turbocharger; a third bypass line in which a third shut-off element is arranged; a third turbine arranged in the exhaust-gas discharge system in parallel with respect to the second turbine of the second exhaust-gas turbocharger, the third turbine equipped with a variable turbine geometry and connected in terms of drive to a generator; a fourth shut-off element for activation purposes arranged upstream of the third turbine, a first bypass line in which a first shut-off element is arranged and which branches off from the exhaust-gas discharge system upstream of the third turbine and the second turbine of the second exhaust-gas turbocharger and which opens into the exhaust-gas discharge system again downstream of the first turbine and the second turbine; a third compressor arranged in the intake system between the first compressor of the first exhaust-gas turbocharger and the second compressor of the second exhaust-gas turbocharger and which is connected in terms of drive to an electric motor; and a second bypass line in which a second shut-off element is arranged and which branches off from the intake system between the first compressor of the first exhaust-gas turbocharger and the third compressor and which opens into the intake system between the third compressor and the second compressor of the second exhaust-gas turbocharger.

The turbine of the second exhaust-gas turbocharger, which will hereinafter also be referred to as the second turbine, is in the present case equipped with a bypass line. According to the disclosure, it is additionally the case that a further turbine is provided in the high-pressure stage, which further turbine is arranged in parallel with respect to said second turbine, that is to say the high-pressure turbine. Both turbines of the high-pressure stage can be bypassed via a bypass line, specifically the first bypass line. This makes it possible for the high-pressure turbine to be configured for very low exhaust-gas flow rates.

The associated compressor of the HP exhaust-gas turbocharger is of correspondingly small dimensions, whereby the surge limit is shifted toward very low charge-air flow rates and high charge pressures can be realized in a first operating mode even at very low engine speeds. The torque characteristic of the internal combustion engine in the low engine speed range is improved considerably as a result.

In one example, in the presence of very low charge-air flow rates (e.g. at low engine speed), the boosting system operates as the two-stage conventional turbocharger system in the first operating mode, wherein the additional compressor, first HP turbine, and the second turbine bypass line are deactivated by virtue of the respective valves being closed. That way, the airflow will be compressed by the HP compressor and flow through the second HP turbine in the exhaust system. The very small high-pressure stage of the internal combustion engine is less inert. The relatively fast response of the small high-pressure stage in the event of a load alteration considerably improves the transient behavior of the internal combustion engine.

It should be understood that summary above is provided to introduce in simplified form a selection of concepts that are further described in the detailed description. It is not meant to identify key or essential features of the claimed subject matter, the scope of which is defined uniquely by the claims that follow the details description. Furthermore the claimed subject matter is not limited to implementations that solve any disadvantages notes above or in any part of this disclosure.

DETAILED DESCRIPTION

A turbocharger arrangement of an internal combustion engine refers to a turbocharger arrangement or turbocharger system comprising a low-pressure turbocharging stage and a high-pressure turbocharging stage, which are arranged sequentially. The compressor of the HP exhaust-gas turbocharger is arranged downstream of the compressor of the LP exhaust-gas turbocharger and, for bypassing purposes, is equipped with a second compressor bypass line which is controlled by a second compressor bypass valve. The turbine of the LP exhaust-gas turbocharger is arranged downstream of the second HP turbine of the HP exhaust-gas turbocharger, wherein the second HP turbine is a variable geometry turbine. A first HP turbine, connected to an electrical generator, is arranged parallel to the second HP turbine of the HP exhaust-gas turbocharger, which is controlled by a first turbine bypass valve located upstream of the first HP turbine. An additional compressor, controlled by a first compressor bypass valve, is arranged in the intake system between the LP compressor of the LP exhaust-gas turbocharger and the HP compressor of the HP exhaust-gas turbocharger and is connected to an electrical motor (e-booster). The electrical generator of the first HP turbine is used to provide power for the electrical motor of the additional compressor. A second turbine bypass line, controlled by a second turbine bypass valve, is arranged in the exhaust-gas discharge system upstream of the first and second HP turbines and which opens into the exhaust-gas discharge system again downstream of said turbines. A controller may regulate airflow through the above described system responsive to engine operating conditions by regulating the position of valves along the intake and exhaust systems into the appropriate compressor and turbine portions of the high-pressure turbocharger and the low-pressure turbocharger units.

Figure 1:
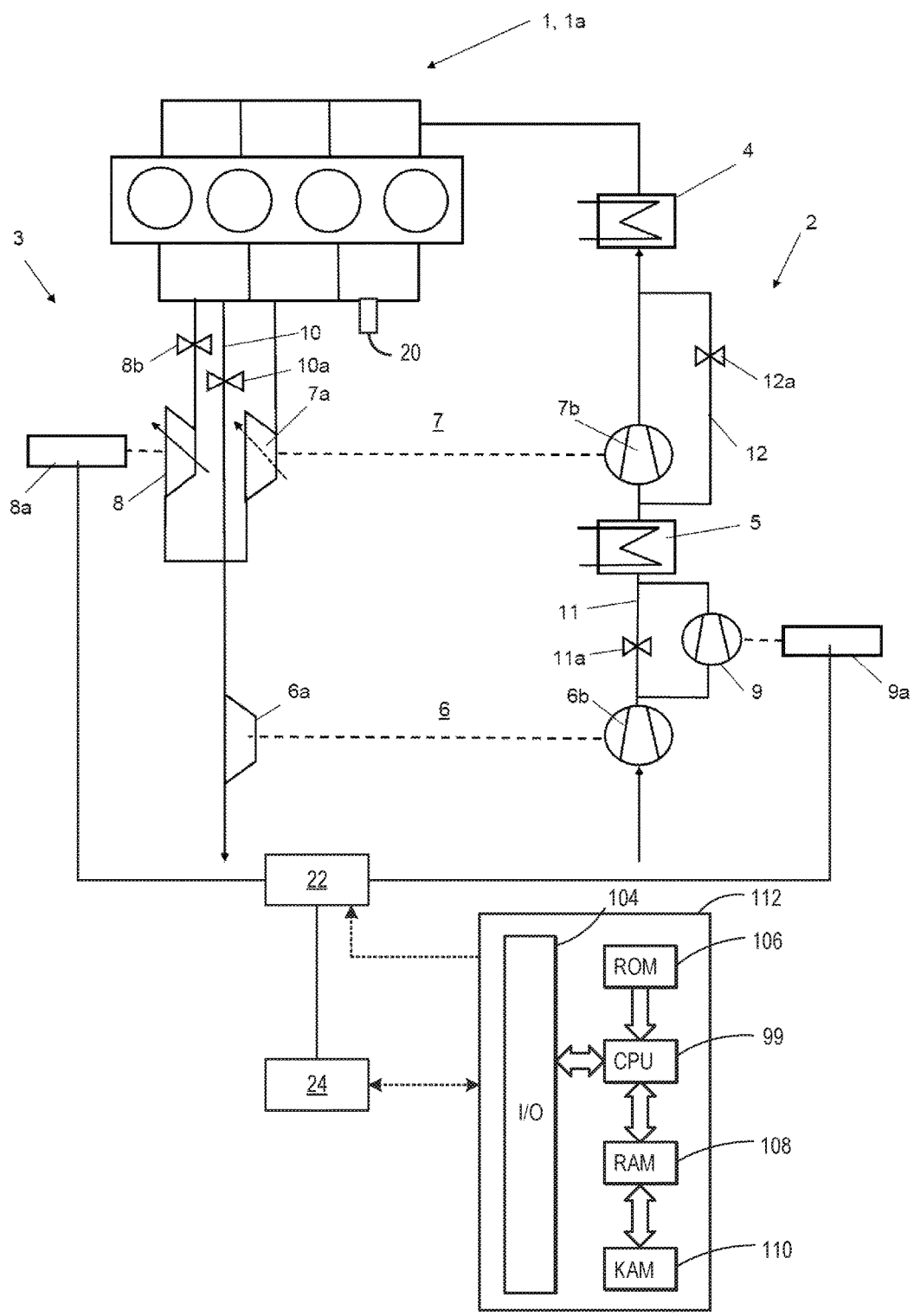
FIG. 1 schematically shows an embodiment of an internal combustion engine.
Figure 2:
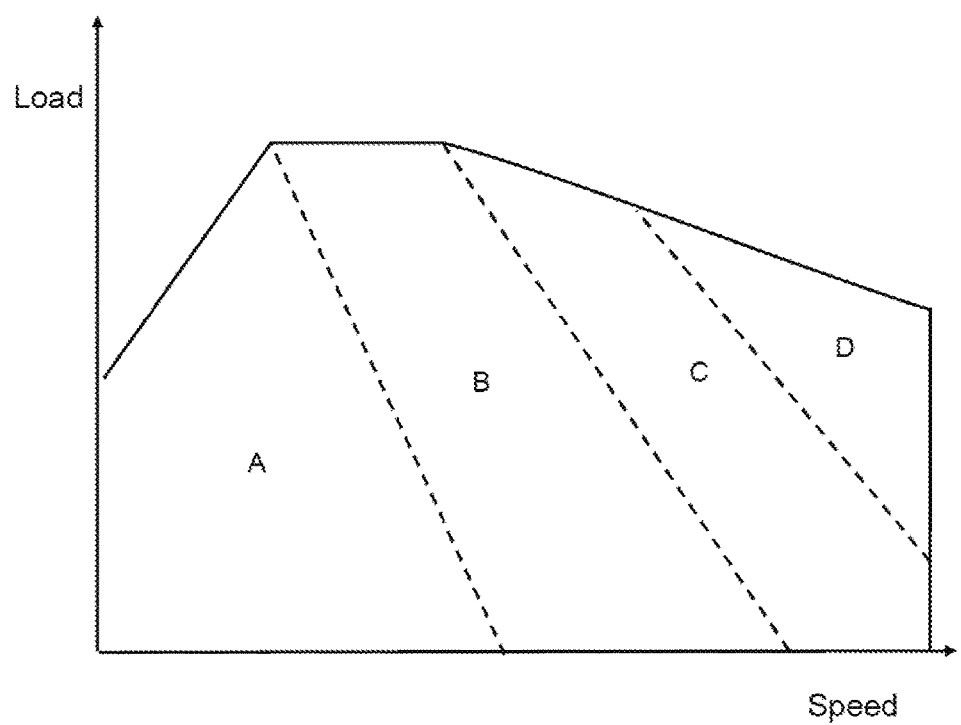
FIG. 2 schematically shows an engine characteristic map of the engine of FIG. 1.
Figure 3:
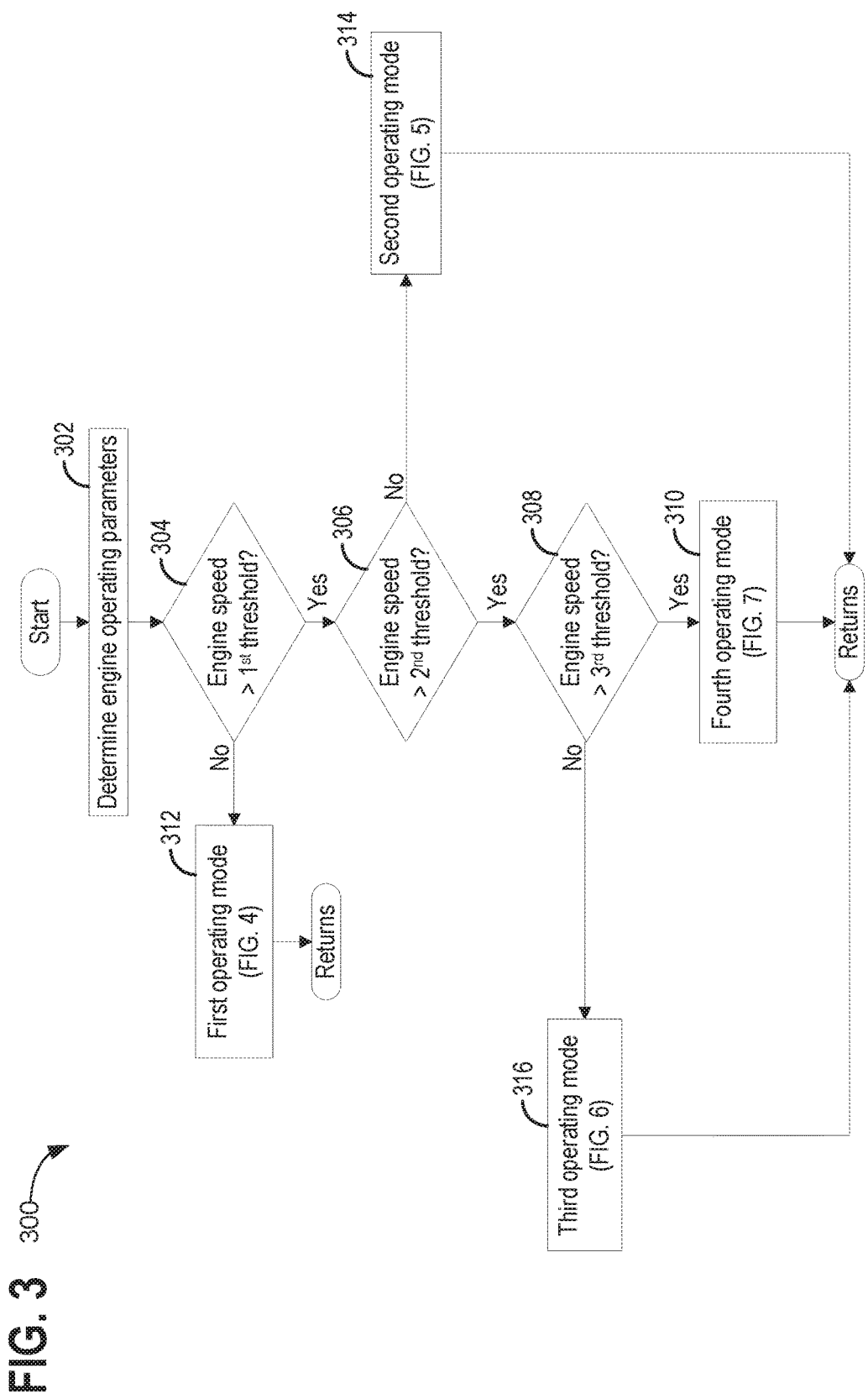
FIG. 3 shows a method for operating the engine of FIG. 1.

The following description relates to systems and methods for operating an engine coupled to at least at least two series-connected exhaust-gas turbochargers. The embodiment illustrated in FIG. 1 schematically shows an embodiment of the supercharged internal combustion engine. FIG. 2 illustrates the engine operating map associated with the internal combustion engine and FIG. 3 illustrates the various operating methods for the engine of FIG. 1. FIGS. 4-7 illustrate methods for each individual operating mode shown in FIG. 3. FIG. 8 is a diagram showing operating parameters that may be observed during execution of the methods described herein.

As explained above, the engine system according to the disclosure includes two turbochargers arranged in series, a turbo-generator, and electrically-driven additional compressor. The engine system may be operated in a plurality of operating modes based on engine speed and load, for example. In a first operating mode executed at relatively low to mid engine speeds, the system operates similar to a standard two-stage turbocharger system, with exhaust gas flowing through a high-pressure turbine and then a low-pressure turbine. The additional compressor which is electrically driveable may be used in an assistive manner when indicated to generate a demanded charge pressure. Since the additional compressor is used only briefly in the first operating mode, the provision of the electric drive power does not pose a problem.

If the exhaust-gas flow rate increases, a switch is made from the two-stage supercharging by way of the two exhaust-gas turbochargers to three-stage supercharging in accordance with a second operating mode, in which the additional compressor is permanently operated. The electrical energy used for the drive of the additional compressor is then provided—at least inter alia—by the turbine of the turbo-generator arranged in the high-pressure stage (e.g., upstream of the low-pressure turbine), which further turbine is, according to the disclosure, connected in terms of drive to a generator. For this purpose, the further turbine is activated by virtue of a shut-off element arranged upstream being actuated.

The electrical energy recovered using the further turbine and the generator is at least partially utilized for the drive of the additional compressor by way of an electric motor. This interaction of the further turbine with the additional compressor permits the permanent operation of the additional compressor in the first place, which additional compressor utilizes amounts of electrical energy which could not be provided, or could be provided only with difficulty, by way of energy stores, for example by way of on-board batteries.

The further turbine (of the turbo-generator) may basically be used for energy recovery as soon as excess exhaust gas is present at the high-pressure turbine. The variable turbine geometry of the further turbine makes it possible for the pressure prevailing upstream in the exhaust-gas discharge system to be set and/or controlled, and thus for the turbine pressure ratio prevailing across the high-pressure turbine, or the charge pressure generated at the intake side, to be set and/or controlled.

If the exhaust-gas flow rate then increases (for example, due to an increase in engine speed), the compressor of the high-pressure stage, that is to say the compressor of the second exhaust-gas turbocharger, which is sized for very low charge-air flow rates, may be bypassed via the bypass line, and two-stage supercharging is performed, in a third operating mode, by way of the first exhaust-gas turbocharger and additional compressor. The electrical energy utilized for the drive of the additional compressor is again provided by the further turbine arranged in the high-pressure stage, which is activated in the presence of the prevailing, relatively high exhaust-gas flow rates.

In the presence of high or very high exhaust-gas flow rates or charge-air flow rates, it is then the case that single-stage compression is performed, in a fourth operating mode, by way of the first exhaust-gas turbocharger, wherein both the compressor of the high-pressure stage, that is to say the compressor of the second exhaust-gas turbocharger, and the additional compressor are bypassed via the bypass line. The further turbine is activated. The turbine of the high-pressure stage, that is to say the turbine of the second exhaust-gas turbocharger, may, if a variable turbine geometry is provided, be deactivated to a certain extent by virtue of said geometry being closed.

Since it is the case according to the disclosure that, in the fourth operating mode, the low-pressure stage covers or has to cover a small characteristic map region in relation to a conventional two-stage supercharging arrangement, it is possible for the low-pressure stage according to the disclosure to be configured with a focus on power, that is to say with regard to as high a maximum power as possible.

Embodiments of the supercharged internal combustion engine are provided in which the third bypass line branches off from the intake system between the additional compressor and the compressor of the second exhaust-gas turbocharger and which opens into the intake system downstream of the compressor of the second exhaust-gas turbocharger.

Embodiments of the supercharged internal combustion engine are provided in which the first bypass line opens into the exhaust-gas discharge system upstream of the turbine of the first exhaust-gas turbocharger.

Embodiments of the supercharged internal combustion engine are provided in which the turbine of the second exhaust-gas turbocharger is equipped with a variable turbine geometry.

According to the disclosure, the turbine of the second exhaust-gas turbocharger is configured for very low exhaust-gas flow rates in any case, whereby the torque characteristic of the internal combustion engine at very low engine speeds is considerably improved. A variable turbine geometry additionally increases the flexibility of the supercharging. It permits a continuously variable adaptation of the turbine geometry to the respective operating point of the internal combustion engine, in particular to the present exhaust-gas mass flow in the lower engine speed range.

Here, guide blades for influencing the flow direction are arranged upstream of the at least one impeller of the turbine. In contrast to the impeller blades of the rotating impeller, the guide blades do not rotate with the shaft of the turbine, that is to say with the impeller. The guide blades are duly arranged so as to be stationary but not so as to be completely immovable, rather so as to be rotatable about their axis such that the flow approaching the impeller blades can be influenced.

In contrast, if a turbine has a fixed, invariable geometry, the guide blades are not only stationary but are also completely immovable, that is to say rigidly fixed, if a guide device is provided.

Embodiments of the supercharged internal combustion engine are provided in which an intercooler is arranged in the intake system between the additional compressor and the compressor of the second exhaust-gas turbocharger. In particular in the second operating mode, in which three-stage supercharging is implemented, the intercooler compresses, by cooling, the charge air that has been pre-compressed in the permanently operated additional compressor. This supports, or permits in the first place, the use of the high-pressure compressor in the context of the three-stage compression in the presence of medium or relatively high charge-air flow rates. Here, it may be taken into consideration that the high-pressure compressor is, from the outset, configured for very low charge-air flow rates.

The third bypass line provided for bypassing the high-pressure compressor branches off from the intake system preferably downstream of the intercooler. Embodiments of the supercharged internal combustion engine may however also be provided in which the third bypass line branches off from the intake system upstream of the intercooler. Then, the third bypass line also serves for bypassing the intercooler.

Embodiments of the supercharged internal combustion engine are provided in which a charge-air cooler is arranged in the intake system downstream of the compressor of the second exhaust-gas turbocharger. The charge-air cooler lowers the air temperature and thereby increases the density of the charge air, as a result of which the cooler also contributes to improved charging of the cylinders with charge air, that is to say to a greater air mass. In an example, the charge-air cooler may be equipped with a bypass line which permits bypassing of the cooler, in particular in the warm-up phase. The latter also applies analogously to the intercooler.

The third bypass line provided for bypassing the high-pressure compressor opens into the intake system upstream of the charge-air cooler, in one example. Embodiments of the supercharged internal combustion engine may however also be provided in which the third bypass line opens into the intake system downstream of the charge-air cooler. Then, the third bypass line also serves for bypassing the charge-air cooler.

Embodiments of the supercharged internal combustion engine are provided in which a battery for storing electrical energy is provided. If the operation of the internal combustion engine does not presently allow electrical energy to be recovered from the exhaust gas using the further turbine and the generator, it may be possible for the drive of the additional compressor to be at least briefly ensured by way of an electric motor using an energy store. Furthermore, it may be made possible for energy recovered at the further turbine to be able to be stored or temporarily stored if there is not presently a demand for electrical energy.

Embodiments of the supercharged internal combustion engine may be provided in which the turbine of the first exhaust-gas turbocharger is equipped with a bypass line which branches off from the exhaust-gas discharge system upstream of the turbine and which opens into the exhaust-gas discharge system preferably downstream of the turbine. It is then possible for exhaust-gas aftertreatment of all of the exhaust gas to be performed jointly, specifically by way of an exhaust-gas aftertreatment system arranged in the exhaust-gas discharge system. This may for example be a particle filter, an oxidation catalytic converter and/or an exhaust-gas aftertreatment system for the reduction of nitrogen oxides.

Another example provides for a method wherein, in a first operating mode, proceeding from a situation in which a shut-off element is closed, a first shut-off element is closed, a third shut-off element is closed and a second shut-off element is open, the shut-off element belonging to the further turbine is opened if the exhaust-gas flow rate exceeds a first predefinable exhaust-gas flow rate, in order to set an exhaust-gas pressure prevailing in the exhaust-gas discharge system upstream of the further turbine by adjustment of the variable turbine geometry of the further turbine, power generated from the exhaust gas at the further turbine being received by the generator and being converted into recovered electrical energy.

That which has already been stated with regard to the internal combustion engine according to the disclosure also applies to the method according to the disclosure, for which reason reference is generally made at this juncture to the statements made above with regard to the internal combustion engine according to the disclosure. The different internal combustion engines may demand, in part, different method variants.

Method variants are provided in which, in the first operating mode, the second shut-off element is closed and the additional compressor is driven by way of the electric motor if a load alteration demands an increased charge pressure. In this way, the response behavior of the supercharging arrangement and of the supercharged internal combustion engine may be noticeably improved.

Embodiments of the method are provided in which, proceeding from the first operating mode, the internal combustion engine is switched into a second operating mode, in which the shut-off element is open and the first shut-off element, the second shut-off element and the third shut-off element are closed, if the exhaust-gas flow rate exceeds a second predefinable exhaust-gas flow rate, at least a part of the electrical energy recovered by the generator being made utilizable for drive of the additional compressor by way of the electric motor.

In this context, embodiments of the method are provided in which, proceeding from the second operating mode, the internal combustion engine is switched into a third operating mode, in which the shut-off element and the third shut-off element are open and the first shut-off element and the second shut-off element are closed, if the exhaust-gas flow rate exceeds a third predefinable exhaust-gas flow rate.

In this context, embodiments of the method may be provided in which, proceeding from the third operating mode, the internal combustion engine is switched into a fourth operating mode, in which the shut-off element, the first shut-off element, the second shut-off element and the third shut-off element are open, if the exhaust-gas flow rate exceeds a fourth predefinable exhaust-gas flow rate.

FIG. 1 schematically shows a supercharged internal combustion engine 1, which has an intake system 2 for the supply of charge air to the cylinders and has an exhaust-gas discharge system 3 for the discharge of the exhaust gases. The internal combustion engine 1 is a four-cylinder in-line engine 1*a* in which the four cylinders are arranged in a line, that is to say along the longitudinal axis of the cylinder head.

The internal combustion engine 1 is equipped with two exhaust-gas turbochargers 6, 7 which are connected in series and which each comprise a turbine 6*a*, 7*a* arranged in the exhaust-gas discharge system 3 and a compressor 6*b*, 7*b* arranged in the intake system 2 and of which a first exhaust-gas turbocharger 6 serves as a low-pressure stage and a second exhaust-gas turbocharger 7 serves as a high-pressure stage. The hot exhaust gas expands in each turbine 6*a*, 7*a* of the exhaust-gas turbochargers 6, 7 with a release of energy, and drives the associated compressors 6*b*, 7*b*, which compresses the charge air and supplies it via the intake system 2 and plenum to the cylinders, whereby supercharging of the internal combustion engine 1 is realized. The turbine 6*a* of the first exhaust-gas turbocharger 6 may be referred to as a low-pressure (LP) turbine and/or as a first turbine. The further turbine of the turbo-generator may be referred to as a first high-pressure (HP) turbine and/or as a third turbine. The turbine 7*a* of the second exhaust-gas turbocharger 7 may be referred to as a second high-pressure (HP) turbine and/or as a second turbine. The compressor 6*b* of the first exhaust-gas turbocharger 6 may be referred to as a low-pressure (LP) compressor and/or as a first compressor. The compressor 7*b* of the second exhaust-gas turbocharger 7 may be referred to as a high-pressure (HP) compressor and/or a second compressor.

The HP compressor 7*b* of the second exhaust-gas turbocharger 7 is arranged downstream of the LP compressor 6*b* of the LP exhaust-gas turbocharger 6 and, for bypassing purposes, is equipped with a second compressor bypass line 12 in which a second compressor bypass valve 12*a* is arranged (the second compressor bypass valve may also be referred to as a third shut-off element). The second compressor bypass valve 12*a* may be a valve 12*a* which is switchable in two-stage fashion and which opens up or blocks the second compressor bypass line 12.

The LP turbine 6*a* of the first exhaust-gas turbocharger 6 is arranged downstream of the second HP turbine 7*a* of the HP exhaust-gas turbocharger 7, wherein, in the high-pressure stage, there is provided a first HP turbine 8 which is arranged in the exhaust-gas discharge system 3 in parallel with respect to the second HP turbine 7*a* of the HP exhaust-gas turbocharger 7. Said first HP turbine 8 is equipped with a variable turbine geometry and is connected in terms of drive to a generator 8*a*. A first turbine bypass valve 8*b* (also referred to as a shut-off element and/or a fourth shut-off valve) arranged in the exhaust-gas discharge system 3 upstream of the first HP turbine 8 serves for the activation of said first HP turbine 8. In the present case, the first turbine bypass valve 8*b* is a valve 8*b* which is switchable in two-stage fashion and which opens up or blocks the line to the first HP turbine 8. The second HP turbine 7*a* of the HP exhaust-gas turbocharger 7 may likewise be equipped with a variable turbine geometry (indicated by a dotted arrow).

Furthermore, a second turbine bypass line 10 is provided which branches off from the exhaust-gas discharge system 3 upstream of the first HP turbine 8 and the second HP turbine 7*a* of the HP exhaust-gas turbocharger 7 and which opens into the exhaust-gas discharge system 3 again downstream of said HP turbines 7a, 8 and which makes it possible for the two turbines 7a, 8 of the high-pressure stage to be bypassed.

A second turbine bypass valve 10a (also referred to as a first shut-off element) is arranged in said second turbine bypass line 10, which is switchable in two-stage fashion and which opens up or shuts off the second turbine bypass line 10.

An additional compressor 9 is arranged in the intake system 2 between the LP compressor 6b of the LP exhaust-gas turbocharger 6 and the HP compressor 7b of the HP exhaust-gas turbocharger 7, which is connected to an electric motor 9a and can be bypassed via a first compressor bypass line 11 controlled by a first compressor bypass valve 11a (also referred to as a second shut-off element). The first compressor bypass line 11 branches off from the intake system 2 between the LP compressor 6b and the additional compressor 9, and opens into the intake system 2 again between the additional compressor 9 and the HP compressor 7b.

A charge-air cooler 4 is arranged in the intake system 2 downstream of the compressors 6b, 7b. The charge-air cooler 4 lowers the air temperature and thereby increases the density of the charge air, which contributes to the improved charging of the cylinders with charge air.

An intercooler 5 is arranged in the intake system 2 between the additional compressor 9 and the HP compressor 7b. In the context of three-stage supercharging in a second operating mode, the intercooler 5 cools charge air that has been pre-compressed in the additional compressor 9. This supports the subsequent compression in the high-pressure compressor 7b in the presence of medium or relatively high charge-air flow rates.

The second compressor bypass line 12 (also referred to as the third bypass line) branches off from the intake system 2 downstream of the intercooler 5, which enables HP compressor 7b to be bypassed. The first compressor bypass line 11 (also referred to as the second bypass line) allows the additional compressor 9 to be bypassed and opens into the intake system 2 upstream of the intercooler 5.

The first HP turbine 8 is used for energy recovery as soon as excess exhaust gas is present at the high-pressure turbine 7a. The variable turbine geometry of the first HP turbine 8 permits the setting of the exhaust-gas back pressure prevailing upstream in the exhaust-gas discharge system 3.

The additional compressor 9 is electrically driven by the electrical motor 9a and is activated when indicated in order to provide a demanded charge pressure. The electrical energy recovered using the first HP turbine 8 and the generator 8a can be at least partially utilized to drive the additional compressor 9 by way of an electrical motor 9a.

The generator 8a and the electrical motor 9a may be electrically coupled via a set of power electronics 22. The power electronics 22 may be controlled responsive to commands sent from the controller 112 (described below). The power electronics may directly supply electrical energy generated by the generator to the electrical motor, without transferring electrical energy to and/or from a battery, at least during certain operating modes. In some examples, a battery 24 may be coupled to the power electronics 22. At least during some operating modes, the controller may command electrical energy generated by the generator 8a to be stored in the battery and/or may command electrical motor 9a to receive electrical energy stored in battery 24.

The engine system may further include a control system. The control system may include a controller 112. The controller 112 is shown in FIG. 1 as a microcomputer, including microprocessor unit 99, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP. One or more temperature sensors (not shown) may be positioned in the exhaust to measure exhaust gas temperature, exhaust-gas aftertreatment system temperature, or other temperatures. Further, one or more exhaust sensors 20 may be positioned in the exhaust system (e.g., at the exhaust manifold). The exhaust sensors may be configured to measure one or more parameters of the exhaust gas, such as temperature, oxygen concentration, and exhaust mass flow.

Storage medium read-only memory 106 can be programmed with computer readable data representing instructions executable by processor 99 for performing the methods described below as well as other variants that are anticipated but not specifically listed. Example methods are described with reference to FIGS. 3-7.

The controller 112 receives signals from the various sensors of FIG. 1 and employs the various actuators of FIG. 1 to adjust engine operation based on the received signals and instructions stored on a memory of the controller. For example, the controller may receive feedback from one or more sensors to determine engine load, engine speed, and/or exhaust gas mass flow (such as feedback from MAF, MAP, PIP sensors, and exhaust sensors) and may then adjust an actuator coupled to the first compressor bypass valve 11a, the second compressor bypass valve 12a, the first turbine bypass valve 8b, and the second turbine bypass valve 10a to adjust the position of the valves.

Altogether, it is possible for four different operating modes or supercharging concepts to be realized.

FIG. 2 schematically shows the engine characteristic map associated with the internal combustion engine 1 illustrated in FIG. 1. The engine characteristic map shows the torque of engine (engine load) versus engine speed reflecting operation conditions of the engine. Four different operating modes A, B, C and D are shown, wherein A denotes the first, B denotes the second, C denotes the third and D denotes the fourth operating mode.

The first operating mode A is activated when the exhaust gas flow rate is relatively small, for example due to the engine speed being below a first threshold speed. In this operation mode, the turbocharging system of the disclosure is operated as a conventional two-stage turbocharging system and the engine is operating in a high-pressure-stage condition to generate demanded boost to the engine. The second compressor bypass valve 12a, the first turbine bypass valve 8b, and the second turbine bypass valve 10a are fully closed, causing the additional compressor 9 and the first HP turbine to be bypassed. Accordingly, the LP turbine 6a and HP turbine 7a are in operation, driving the LP compressor 6b and HP compressor 7b to exert a two-stage compression on the intake air. Thus, the engine boost is provided by both the low-pressure and high-pressure turbochargers. Once the exhaust gas flow reaches a threshold value, the first turbine bypass valve may be actuated to an open position, allowing the exhaust gas to partially flow through the first HP turbine 8*b* and generating energy via the electrical generator 8*a*. This enables energy recuperation from the engine and helps to control the exhaust backpressure.

If an increase in engine load is detected, for example when the vehicle is moving uphill, the first compressor bypass valve is actuated to a closed position, allowing charged air to flow through the additional compressor 9 and providing an extra boost pressure to the engine. In this case, the engine transient performance is supported by the electrical motor 9*a*, using the power supplied via the turbine generator 8*a*. Thus, the turbo lag period and deficiency in performance of the turbocharger at low engine speed and increasing engine load state can be mitigated via the use of external power source provided by the electrical motor 9*a*.

When the engine speed exceeds the first threshold speed, and is below a second threshold speed, at a steady engine load state, the engine operating mode transitions from the first mode, A, to the second mode, B. In this operation mode, the turbocharging system of the disclosure is operated as a three-stage turbocharging system whereby the first compressor bypass valve 11*a*, the second compressor bypass valve 12*a*, and the second turbine bypass valve 10*a* are closed. Accordingly, the LP compressor 6*b*, the additional compressor 9, and the HP compressor 7*b* are in operation, to exert a three-stage compression on the intake air. The exhaust gas flows through both HP turbines, 8 and 7*a*, before reaching the LP turbine 6*a*. The exhaust gas passing through the first HP turbine 8 rotates the rotor of the generator 8*a* to generate electricity, which in turn provides power to the electrical motor 9*a*, which drives the additional compressor 9. This way, the risk of depleting the energy stored in the battery coupled to the electrical motor 9*a* for driving the additional compressor 9 may be reduced.

When the engine speed reaches above the second threshold speed, below a third threshold speed, the engine operating mode transitions from the second mode, B, to third mode, C. In this operation mode, the turbocharging system of the disclosure is operated as a two-stage turbocharging system whereby the first compressor bypass valve 11*a* and the second turbine bypass valve 10*a* are closed. Accordingly, the LP compressor 6*b* and the additional compressor 9 are in operation to exert a two-stage compression on the intake air. The exhaust gas passes through both HP turbines, 8 and 7*a*, and the LP turbine 6*a*. The increase in the exhaust gas flow rate in the exhaust system 3 allows more energy to be generated by the generator 8*a*, which in turn, enables the electrical motor 9*a* to run permanently without the risk of power depletion.

When the engine speed reaches above the third threshold speed, the engine operating mode transitions from the third mode, C, to fourth mode, D. In this operation mode, the turbocharging system of the disclosure is operated as a one-stage turbocharging system whereby all four bypass valves are open. Accordingly, the LP compressor 6*b* is the only compressor in operation, to exert a one-stage compression on the intake air. The exhaust gas passes through the second turbine bypass line 10 and some exhaust gas may travel through each HP turbine so that air flow will be directed partially to the turbine generator 8*a*, allowing electrical energy to be generated.

Referring now to FIG. 3, an example method 300 for operating the four engine operation modes is provided. Instructions for carrying out method 300 may be executed by a controller, for example, the controller 112 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302 by assessing engine operating parameters, including but not limited to, engine load, engine speed, boost pressure (which may be a measurement of intake manifold pressure relative to ambient pressure, for example), exhaust gas mass flow, and other parameters. The method 300 then proceeds to 304 to assess if the engine speed is above a first threshold speed. In one example, the first threshold speed may be mid-to-low engine speed, such as 2000 RPM. In another example, the method may assess engine speed and engine load and may determine if the engine is operating in a first speed-load region, such as the region A of FIG. 2. Additionally, the first threshold speed may be a variable threshold that changes based on engine load, e.g., the first threshold speed may decrease as engine load increases. If the engine speed is not above the first threshold speed, the method 300 proceeds to 312 whereby the first operating mode A is activated, which will be described in detail with respect to FIG. 4.

If the engine speed is above the first threshold speed, the method proceeds to 306 and determines if the engine speed is above a second threshold speed. The second threshold speed is higher than the first threshold speed, and may be a mid-range engine speed, such as 3000 RPM. In another example, the method may assess engine speed and engine load and may determine if the engine is operating in a second speed-load region, such as the region B of FIG. 2. Additionally, the second threshold speed may be a variable threshold that changes based on engine load, e.g., the second threshold speed may decrease as engine load increases. If the engine speed is above the second threshold speed, the method proceeds to 308, otherwise if the engine speed is not above the second threshold speed, the method proceeds to 314 whereby the second operating mode B is activated, which will be explained below with respect to FIG. 5.

At 308, the method determines if the engine speed is above a third threshold speed. The third threshold speed is higher than the second threshold speed, and may be a relatively high engine speed, such as 3500 RPM. In another example, the method may assess engine speed and engine load and may determine if the engine is operating in a third speed-load region, such as the region C of FIG. 2. Additionally, the third threshold speed may be a variable threshold that changes based on engine load, e.g., the third threshold speed may decrease as engine load increases. If the engine speed is not above the third threshold speed, the method proceeds to 316, whereby the third operating mode C is activated, which will be explained in detail below with respect to FIG. 6. If the engine speed is above the third threshold speed, the method proceeds to 310, whereby the fourth operating mode D is activated, which will be described below with respect to FIG. 7. In some examples, the fourth operating mode may be activated when engine speed is above the second threshold speed and engine load is above a threshold load, where the threshold load decreases as engine speed increases (e.g., region D of FIG. 2).

While the decision of which of the four operating modes to operate in is described above as being made with respect to engine speed, other parameters may be assessed to determine operating mode. For example, exhaust gas flow rate may be measured (e.g., via sensors 20 of FIG. 1) or estimated (e.g., via intake air mass flow and fuel injection amounts), and the selection of an operating mode may be made based on exhaust gas flow rate (e.g., the first mode may be selected when the exhaust gas flow rate is below a first threshold, the second mode may be selected when the exhaust gas flow rate is below a second threshold and above the first threshold, the third mode may be selected when the exhaust gas flow rate is below a third threshold and above the second threshold, and the fourth mode may be selected when the exhaust gas flow rate is above the third threshold).

Figure 4:
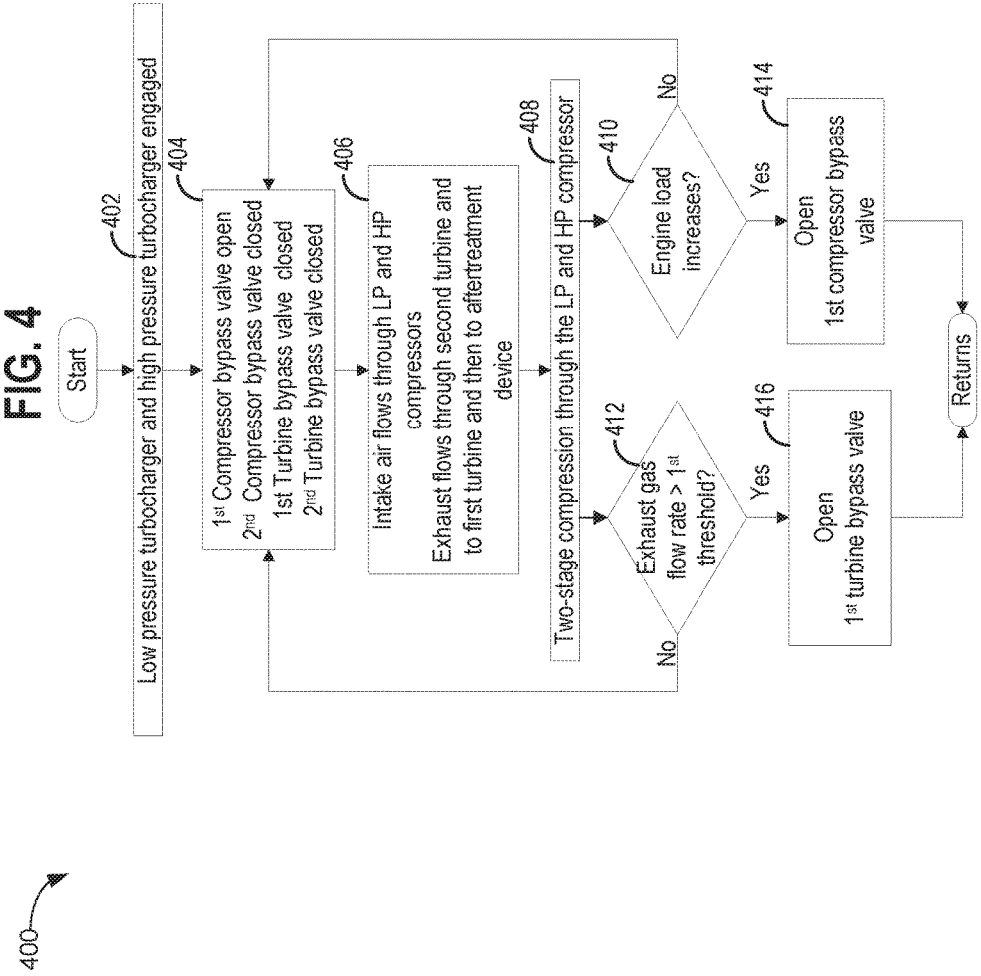
FIG. 4 shows a first mode for operating the engine of FIG. 1.

Turning to FIG. 4, a method for controlling the engine while in the first engine operating mode A is shown. Operation in the mode A may be determined based on an engine-speed load map stored in the memory of the controller during the execution of method 300. At 402, a low pressure turbocharger and a high pressure turbocharger are engaged. At 404, to operate the engine in a first operating mode, the first compressor bypass valve 11a is open, while keeping the second compressor bypass valve 12a, the first turbine bypass valve 8b, and second turbine bypass valve 10a in a closed position. At 406, the intake air flows through the LP compressor 6b and HP compressor 7b and exhaust flows from engine cylinders to the second HP turbine, to the LP turbine, and then to the aftertreatment device. At 408, both the LP compressor and the HP compressor are driven by the LP and HP turbine, respectively, resulting in two stage compression of intake air by the compressors, providing the indicated boost pressure to the engine to meet the torque demand. In the first engine operating mode (mode A), exhaust gas may bypass the first HP turbine and intake air may bypass the additional compressor.

At 410, it is determined if there is an increase in engine load, e.g. if the vehicle commences driving uphill, while remaining at the relatively low engine speed. If the load increase is detected, then the method proceeds to 414, whereby the first compressor bypass valve 11a is opened and the electric motor 9a is activated, allowing transient boost to be provided by the additional compressor 9. If there is no change in the engine load, then the method proceeds to 404, where the first compressor bypass valve remains closed. In one example, the electric motor may be powered by a battery or other energy storage device. In another example, the electric motor may be powered by electric energy generated by the generator 8a, e.g., when sufficient exhaust gas flow is present to drive the first HP turbine. In such an example, the electric motor may receive all electric energy from the generator and may not receive any energy from the battery.

At 412, it is determined if the exhaust gas flow rate in the gas exhaust system 3 is above a first threshold. The determination of the exhaust gas flow rate may be performed in parallel with the determination of the engine load above. If the exhaust gas flow rate is above a first threshold value, then the method proceeds to 416, whereby the first turbine bypass valve 8b is opened, allowing the exhaust to partially flow through the first HP turbine 8 and generate power in the generator 8a. That way, the increase in backpressure may be released and used to generate energy via the generator 8a to drive the motor 9a. If the exhaust gas flow rate does not exceed a first threshold, then the method returns to 404 and the first compressor bypass valve 11a remains closed.

Figure 5:
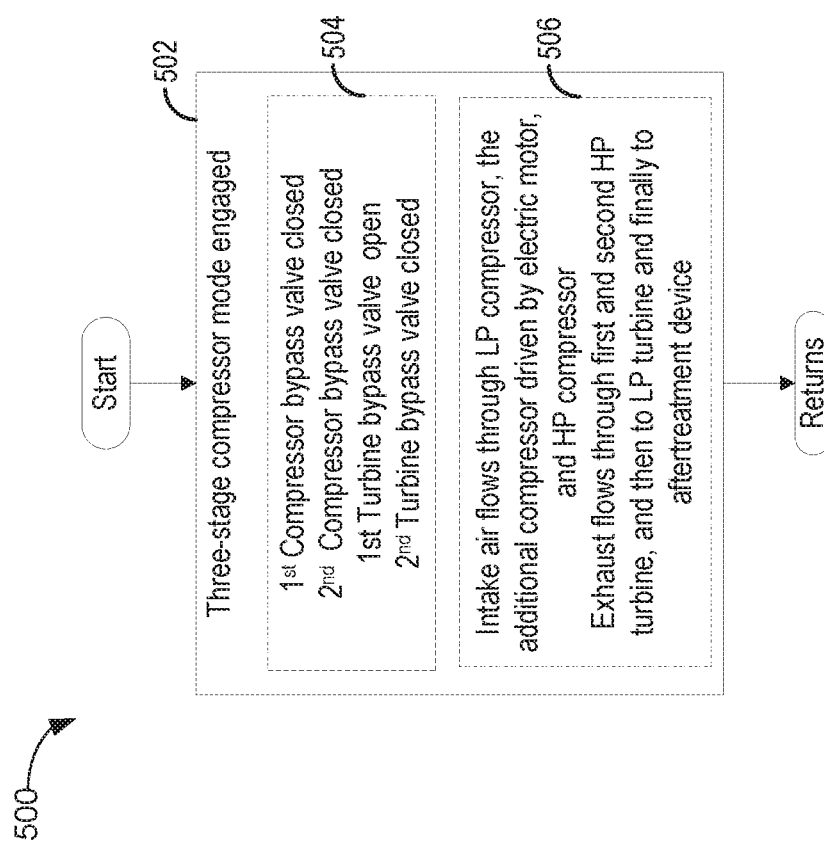
FIG. 5 shows a second mode for operating the engine of FIG. 1.

Referring to FIG. 5, a method 500 for operating the engine in a second operating mode is provided. Method 500 may be executed responsive to the determination that the engine speed is at a first intermediate speed, e.g. above the first threshold but below the second threshold speed, as explained above with respect to FIG. 3 (e.g., when the second operating mode is activated). At 502, a three-stage compressor mode is engaged. The three-stage compressor mode may include, at 504, operating the engine in the second operating mode by opening or maintaining open the first turbine bypass valve 8b, and closing or maintaining closed the first compressor bypass valve 11a, second compressor bypass valve 12a, and second turbine bypass valve 10a. At 506, the intake air flows through LP compressor 6b, the additional compressor 9, and the HP compressor 7b. The additional compressor 9 is driven by the motor 9a. The exhaust flows through the first and second HP turbines, to the LP turbine, and then to the aftertreatment device. At least part of the exhaust system energy is converted to electricity in the generator 8a, which is used to drive the motor 9a of the additional compressor 9. The exhaust gas passing through the first HP turbine 8 rotates the rotor of the generator 8a, which in turn generates electricity at the stator. The electricity may be supplied to directly to the electrical motor, and provides power to the electrical motor 9a, which further drives the additional compressor 9. This way, the risk of depleting the energy in the battery when the electrical motor 9a is driving the additional compressor 9 is reduced.

Figure 6:
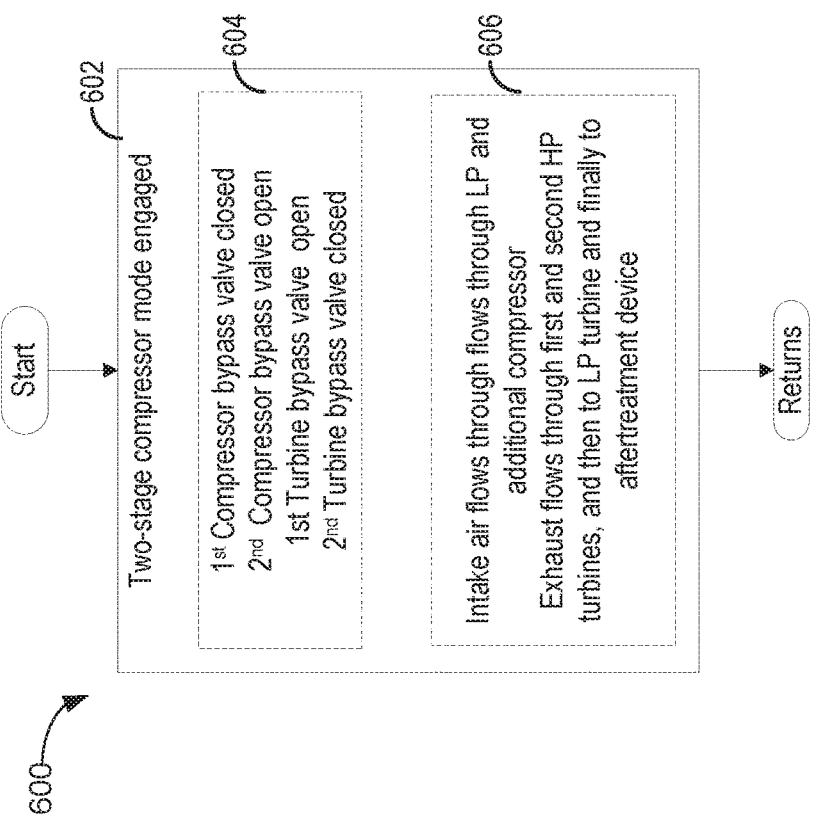
FIG. 6 shows a third mode for operating the engine of FIG. 1.

Referring to FIG. 6, a method 600 for operating the engine in a third operating mode is provided. Method 600 may be executed responsive to the determination that the engine speed at a second intermediate speed, e.g. above the second threshold but below the third threshold speed, as described above with respect to FIG. 3 (e.g., when the third operating mode is activated). At 602, method 600 includes engaging a two-stage compressor mode. The two-stage compressor mode may include, at 604, operating the engine in the third operating mode by opening or maintaining open the second compressor bypass valve 12a and the first turbine bypass valve 8b, while closing or keeping the first compressor bypass valve 11a and second turbine bypass valve 10a in a closed position. At 606, the intake air flows through the LP and additional compressors, bypassing the HP compressor, while the exhaust flows through the second HP turbine, and then to the LP turbine, and finally to aftertreatment device. The geometry of the first HP turbine may be adjusted and/or a wastegate of the first HP turbine may be adjusted in order to preferentially flow exhaust gas through the first HP turbine. The increase in the exhaust gas flow rate in the exhaust system 3 allows more energy to be generated by the generator 8a, which in turn, enables the electrical motor 9a to run permanently without the risk of power depletion.

Figure 7:
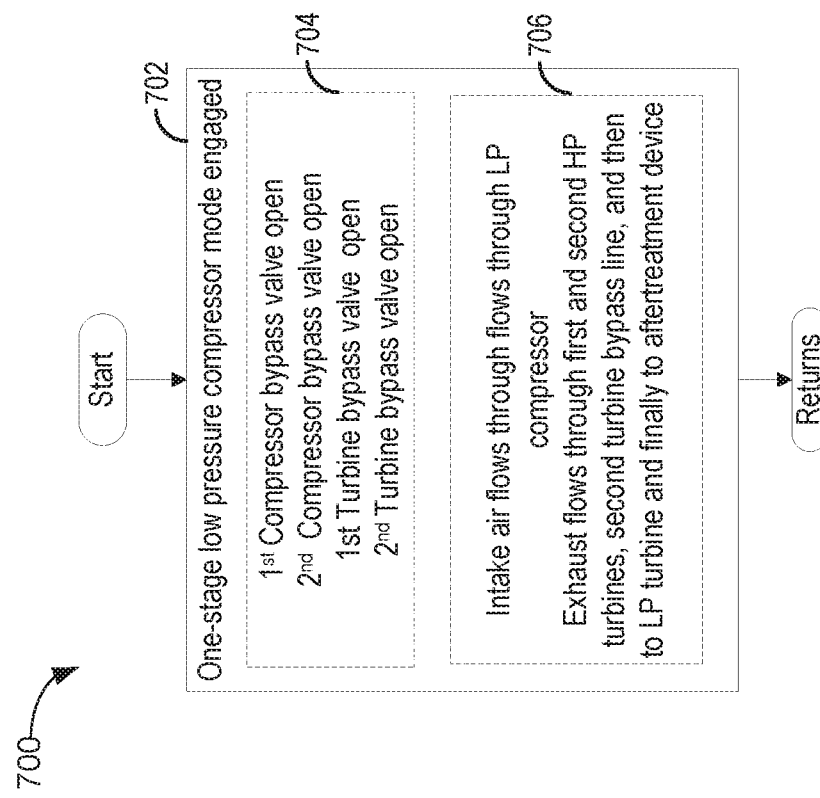
FIG. 7 shows a fourth mode for operating the engine of FIG. 1.
Figure 8:
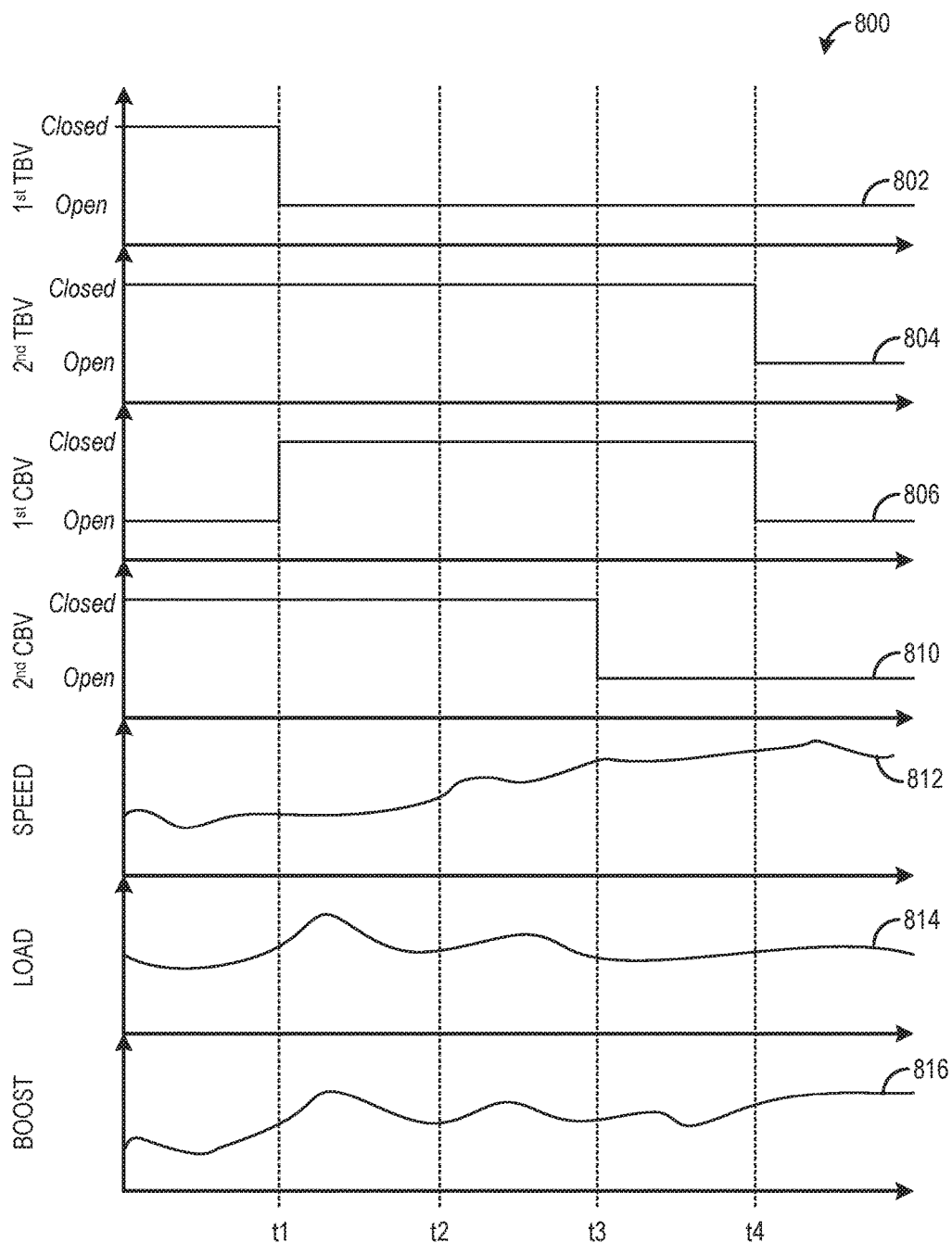
FIG. 8 is a diagram showing example operating parameters.

Now turning to FIG. 7, a method 700 for operating the engine in a fourth operating mode is provided. Method 700 may be executed responsive to the determination that the engine speed exceeds a third threshold speed, as described above with respect to FIG. 3 (e.g., when the fourth operating mode is activated). At 702, method 700 includes engaging a one-stage compressor mode. Engaging the one-stage compressor mode may include, at 704, operating the engine in the fourth operating mode by opening or maintaining open the first turbine bypass valve, second turbine bypass valve, first compressor bypass valve, and second compressor bypass valve. At 706, the intake air flows through flows through LP compressor, while the exhaust flows through the LP turbine, and to aftertreatment device. Depending on the geometry of the first and second HP turbines, a portion of the exhaust may travel through the first and second HP turbines. However, the first and second HP turbines as well as the HP compressor and additional compressor are substantially bypassed.

Thus, operating the engine with single stage, two-stage, or three-stage compression of intake air can effectively manipulate the turbocharger surge line characteristics to meet the engine operating line requirements throughout the speed/load range of the engine.

FIG. 8 is a diagram 800 showing example parameters of interest that may be observed during execution of method 300 and methods 400, 500, 600, and 700, for example. Diagram 800 includes a first plot illustrating a position of the first turbine bypass valve (8b), shown by curve 802, a second plot illustrating a position of the second turbine bypass valve (10a), shown by curve 804, a third plot illustrating a position of the first compressor bypass valve (11a), shown by curve 806, a fourth plot illustrating a position of the second compressor bypass valve (12a), shown by curve 808, a fifth plot illustrating engine speed, shown by curve 810, a sixth plot illustrating engine load, shown by curve 812, and a seventh plot illustrating boost pressure, shown by curve 814. For each plot, time is depicted along the x-axis and values for each respective operating parameter (open and closed for the valve positions, and zero to maximum for the other parameters) are depicted along the y-axis.

Prior to time t1, the engine is operating with mid-to-low engine speed, such as 500-2000 RPM, and as such is operating with engine speed below the first threshold speed. Accordingly, the controller selects the first operating mode, where demanded boost pressure is provided via two-stage compression. The exhaust gas is directed through the high-pressure turbine (e.g., turbine 7a, also referred to as the first HP turbine or the second turbine) and through the low-pressure turbine (e.g., turbine 6a, also referred to as the LP turbine or the first turbine) in order to drive the high-pressure compressor (e.g., compressor 7b, also referred to as the second compressor or the HP compressor) and low-pressure compressor (e.g., compressor 6b, also referred to as the first compressor or LP compressor), respectively. Thus, the first turbine bypass valve (TBV) is closed, the second TBV is closed, the first compressor bypass valve (CBV) is open, and the second CBV is closed. By closing the first TBV and opening the first CBV, exhaust gas and intake air bypass the turbo-generator (e.g., turbine 8, also referred to as the third turbine, further turbine, or second HP turbine) and electrically-driven compressor (e.g., compressor 9, also referred to the additional compressor).

As engine load begins to increase prior to time t1, demanded boost pressure also increases. As a result of the increase in demanded boost pressure, the electrically-driven compressor is activated in order to provide transient boost. As such, at time t1, the first CBV is moved from open to closed, to divert intake air through the electrically-drive compressor. The motor driving the electrically-driven compressor (e.g., motor 9a) may be provided with electrical energy from the turbo-generator. As such, the first TBV is moved from closed to open to direct exhaust gas through the turbine of the turbo-generator.

Thus, during the first operating mode, under steady state conditions, the boosting system operates as a conventional two-stage set-up. In contrast to a conventional set-up, the high pressure stage is matched to deliver high low end torque and very fast transient response only in the very low speed range. Transient performance is additionally supported by the electrically-driven compressor. When the exhaust mass flow is large enough (e.g., backpressure becomes too high), the first TBV is opened and flow may be controlled by the variable geometry turbine generator. This enables energy recuperation and helps to control exhaust backpressure. This operating range shows a very high time share during real world driving. Because of the special matching with a very small high pressure turbocharger, the torque and transient requirements may be fulfilled without risk of battery depletion.

Prior to tune t2, the engine load and boost demand begin to decrease. However, at time t2, engine speed increases to above the first threshold speed but is still below a second threshold speed. Thus, the engine system is moved into the second operating mode. In the second operating mode, three-stage compression of the intake is provided. The first TBV remains open and the second TBV, first CBV, and second CBV remain closed. Intake air flows through all three compressors and exhaust gas flows through all three turbines. Transient boost control (e.g., to meet that transient increase in boost demand that occurs between time t2 and time t3) may be provided by adjusting the geometry of the high-pressure turbine and/or the geometry of the turbine of the turbo-generator (e.g., the third turbine).

Thus, in the second operating mode, the compressor side operates as a 3-stage system. Because the high pressure turbine is know too small for the exhaust mass flow, the first TBV is opened and exhaust mass flow distribution is controlled by the VGT position of the turbine generator. The turbine generator delivers power for the electrically-driven compressor, which is permanently driven. Excessive electrical energy may be stored in the battery. Charge air downstream of the electrically-driven compressor may be cooled in the interstage charge air cooler to increase air density and allow the (small) high-pressure compressor to operate with the delivered air mass.

At time t3, engine speed increases above the second threshold speed but is still below the third threshold speed. In response, the engine system is operated in the third operating mode. In the third operating mode, two-stage compression of the intake air provided, but through the electrically-driven compressor and the low-pressure compressor. As a result, the first TBV is maintained open, the second TBV is maintained closed, the first CBV is maintained closed, and the second CBV is opened. In the third operating mode, the compressor side operates as a 2-stage system. The high pressure compressor is bypassed, as the charge air mass flow becomes too large. The low pressure stage and turbine generator as well as the electrically-driven compressor are operated as in the second operating mode. At time t4, engine speed increases above the third threshold speed. In response, the engine system is operated in the fourth operating mode. In the fourth operating mode, single-stage compression of the intake air is provided. As a result, the first TBV is maintained open, the second TBV is opened, the first CBV is opened, and the second CBV is maintained open. In the fourth operating mode, the system operates like a conventional single stage system. However, the low pressure system matching can be very much focused on best peak power performance, because the operating range in the fourth operating mode covers less speed/load area compared to a conventional 2-stage system.

Another example provides for a method for operating a system including an engine, a first turbocharger having a first turbine driving a first compressor, a second turbocharger having a second turbine driving a second compressor, a turbo-generator including a third turbine coupled to a generator, and an electrically-driven third compressor, the first turbine downstream of the second turbine, the third turbine in parallel to the second turbine. The method comprises, in a first operating mode, in which, proceeding from a situation in which a fourth shut-off element upstream of the third turbine is closed, closing a first shut-off element coupled across the second turbine, closing a third shut-off element coupled across the second compressor, and opening a second shut-off element coupled across the third compressor; opening the fourth shut-off element responsive to an exhaust-gas flow rate exceeding a first predefinable exhaust-gas flow rate, in order to set an exhaust-gas pressure in an exhaust-gas discharge system upstream of the third turbine by adjustment of a variable turbine geometry of the third turbine, and converting power generated from the exhaust gas at the third turbine into recovered electrical energy by the generator.

The method may additionally or alternatively further comprise, in the first operating mode, closing the second shut-off element and driving the third compressor by way of an electric motor responsive to one or more of a change in engine load and an increased demanded charge pressure. The method may additionally or alternatively further comprise, proceeding from the first operating mode, switching into a second operating mode, including opening the fourth shut-off element and the first shut-off element, closing the second shut-off element and maintaining the third shut-off element closed, responsive to the exhaust-gas flow rate exceeding a second predefinable exhaust-gas flow rate, and driving the third compressor with the electric motor, at least a part of the electrical energy recovered by the generator being made utilizable for the driving of the third compressor by way of the electric motor. The method may additionally or alternatively include, proceeding from the second operating mode, switching into a third operating mode, including opening or maintaining open the fourth shut-off element and the third shut-off element and closing or maintaining closed the first shut-off element and the second shut-off element, responsive to the exhaust-gas flow rate exceeding a third predefinable exhaust-gas flow rate. The method may additionally or alternatively further include, proceeding from the third operating mode, switching into a fourth operating mode, including opening or maintaining open the fourth shut-off element, the first shut-off element, the second shut-off element, and the third shut-off element responsive to the exhaust-gas flow rate exceeding a fourth predefinable exhaust-gas flow rate.

Another example provides for a method, comprising: responsive to engine speed below a first threshold speed, flowing exhaust gas through a first turbine and a second turbine; selectively flowing exhaust gas through a third turbine based on an exhaust gas flow rate, the third turbine coupled to a generator; and selectively compressing intake air via an electrically-driven compressor based on boost pressure demand, the electrically-driven compressor supplied with electricity generated by the generator. In a first example, the method additionally or alternatively comprises responsive to engine speed below the first threshold speed, compressing intake air via a first compressor coupled to the first turbine and a second compressor coupled to the second turbine, the electrically-drive compressor arranged between the first compressor and the second compressor. A second example optionally includes the first example and further includes wherein flowing exhaust gas through the first turbine and the second turbine comprises flowing exhaust gas through the second turbine and from the second turbine to the first turbine, the third turbine arranged in parallel with the second turbine. A third example optionally includes one or both of the first and second examples and further includes, responsive to engine speed increasing above the first threshold speed and being below a second threshold speed, flowing exhaust gas through the first turbine, the second turbine, and the third turbine, and compressing intake air via the first compressor, the second compressor, and the electrically-driven compressor, the electrically-driven compressor supplied with electricity generated by the generator. In a fourth example, the method optionally includes one or more of the first through third examples and further includes, responsive to engine speed increasing above the second threshold speed and being below a third threshold speed, flowing exhaust gas through the first turbine and the third turbine, compressing intake air via the first compressor and the electrically-driven compressor, the electrically-driven compressor supplied with electricity generated by the generator, and bypassing the second turbine and the second compressor. In a fifth example, the method optionally includes one or more of the first through fourth examples and further includes, responsive to engine speed increasing above the third threshold speed, flowing exhaust gas through the first turbine, compressing intake air via the first compressor, and bypassing the second turbine, the second compressor, the third turbine, and the electrically-driven compressor.

Another example of a method includes during steady-state engine load conditions with engine speed below a first threshold speed, generating boost pressure via a low-pressure turbocharger and a high-pressure turbocharger; and responsive to an increase in engine load, transiently increasing the boost pressure via an electrically-driven compressor, and supplying electrical energy to the electrically-driven compressor directly from a turbine-driven generator. In a first example, supplying electrical energy to the electrically-driven compressor directly from the turbine-driven generator comprises supplying electrical energy to the electrically-driven compressor directly from the turbine-driven generator without supplying electrical energy to the electrically-driven compressor from a battery. In a second example, which optionally includes the first example, the method further includes adjusting a geometry of a turbine of the turbine-driven generator. In a third example, which optionally includes the first and/or second example, the method further includes, during steady-state engine load conditions with engine speed above the first threshold speed, generating boost pressure via the low-pressure turbocharger, the high-pressure turbocharger, and the electrically-driven compressor; and supplying electrical energy to the electrically-driven compressor directly from the turbine-driven generator. In a fourth example, which optionally includes one or more of the first through third examples, the method further includes when exhaust gas mass flow exceeds a threshold and boost demand is met, storing excess electrical energy generated by the turbine-driven generator in a battery.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine system, comprising:
   an intake system for supply of charge air to an internal combustion engine;
   an exhaust-gas discharge system for discharge of exhaust gases from the internal combustion engine;
   at least two series-connected exhaust-gas turbochargers which each comprise a turbine arranged in the exhaust-gas discharge system and a compressor arranged in the intake system, the at least two series-connected exhaust-gas turbochargers including a first exhaust-gas turbocharger that serves as a low-pressure stage and a second exhaust-gas turbocharger that serves as a high-pressure stage, a second compressor of the second exhaust-gas turbocharger arranged downstream of a first compressor of the first exhaust-gas turbocharger, a first turbine of the first exhaust-gas turbocharger arranged downstream of a second turbine of the second exhaust-gas turbocharger;
   a third bypass line in which a third valve is arranged;
   a third turbine arranged in the exhaust-gas discharge system in parallel with respect to the second turbine of the second exhaust-gas turbocharger, the third turbine equipped with a variable turbine geometry and connected in terms of drive to a generator;
   a fourth valve for activation purposes arranged upstream of the third turbine,
   a first bypass line in which a first valve is arranged and which branches off from the exhaust-gas discharge system upstream of the third turbine and the second turbine of the second exhaust-gas turbocharger and which opens into the exhaust-gas discharge system again downstream of the third turbine and the second turbine;
   a third compressor arranged in the intake system between the first compressor of the first exhaust-gas turbocharger and the second compressor of the second exhaust-gas turbocharger and which is connected in terms of drive to an electric motor; and
   a second bypass line in which a second valve is arranged and which branches off from the intake system between the first compressor of the first exhaust-gas turbocharger and the third compressor and which opens into the intake system between the third compressor and the second compressor of the second exhaust-gas turbocharger.

2. The supercharged internal combustion engine system as claimed in claim 1, wherein the third bypass line branches off from the intake system between the third compressor and the second compressor of the second exhaust-gas turbocharger and opens into the intake system downstream of the second compressor of the second exhaust-gas turbocharger.

3. The supercharged internal combustion engine system as claimed in claim 1, wherein the first bypass line opens into the exhaust-gas discharge system upstream of the first turbine of the first exhaust-gas turbocharger.

4. The supercharged internal combustion engine system as claimed in claim 1, wherein the second turbine of the second exhaust-gas turbocharger is equipped with a variable turbine geometry.

5. The supercharged internal combustion engine system as claimed in claim 1, further comprising an intercooler arranged in the intake system between the third compressor and the second compressor of the second exhaust-gas turbocharger.

6. The supercharged internal combustion engine system as claimed in claim 1, further comprising a charge-air cooler arranged in the intake system downstream of the second compressor of the second exhaust-gas turbocharger.

7. The supercharged internal combustion engine system as claimed in claim 1, further comprising a battery for storing electrical energy.

8. The supercharged internal combustion engine system as claimed in claim 1, further comprising a fourth bypass line which branches off from the exhaust-gas discharge system upstream of the first turbine and which opens into the exhaust-gas discharge system downstream of the first turbine.

9. A method, comprising:
   responsive to engine speed below a first threshold speed, flowing exhaust gas through a first turbine and a second turbine;
   selectively flowing exhaust gas through a third turbine based on an exhaust gas flow rate, the third turbine coupled to a generator; and
   selectively compressing intake air via an electrically-driven compressor based on boost pressure demand, the electrically-driven compressor supplied with electricity generated by the generator.

10. The method of claim 9, further comprising, responsive to engine speed below the first threshold speed, compressing intake air via a first compressor coupled to the first turbine and a second compressor coupled to the second turbine, the electrically-driven compressor arranged between the first compressor and the second compressor, wherein the supply of electricity generated by the generator is supplied to the electrically-driven compressor without adding or subtracting current to a battery, at least for an entire duration of speed below the first threshold speed.

11. The method of claim 10, wherein flowing exhaust gas through the first turbine and the second turbine comprises flowing exhaust gas through the second turbine and from the second turbine to the first turbine, the third turbine arranged in parallel with the second turbine.

12. The method of claim 11, further comprising, responsive to engine speed increasing above the first threshold speed and being below a second threshold speed, flowing exhaust gas through the first turbine, the second turbine, and the third turbine, and compressing intake air via the first compressor, the second compressor, and the electrically-driven compressor, the electrically-driven compressor supplied with electricity generated by the generator.

13. The method of claim 12, further comprising, responsive to engine speed increasing above the second threshold speed and being below a third threshold speed, flowing exhaust gas through the first turbine and the third turbine, compressing intake air via the first compressor and the electrically-driven compressor, the electrically-driven compressor supplied with electricity generated by the generator, and bypassing the second turbine and the second compressor.

14. The method of claim 13, further comprising, responsive to engine speed increasing above the third threshold speed, flowing exhaust gas through the first turbine, compressing intake air via the first compressor, and bypassing the second turbine, the second compressor, the third turbine, and the electrically-driven compressor.

* * * * *